United States Patent

[11] 3,589,585

| [72] | Inventor | Renzo Giuseppe Cerioni<br>Corso Venezia, 10 Milan, Italy |
|---|---|---|
| [21] | Appl. No. | 761,250 |
| [22] | Filed | Sept. 20, 1968 |
| [45] | Patented | June 29, 1971 |
| [32] | Priority | Feb. 28, 1968 |
| [33] | | Italy |
| [31] | | 13.317/68 |

[54] DEVICE FOR THE APPLICATION OF TAPE TO WIRE
4 Claims, 6 Drawing Figs.

[52] U.S. Cl. ............................................. 227/76,
227/120
[51] Int. Cl. ..................................................... B25c 5/02

[50] Field of Search .......................................... 227/12, 13,
20, 21, 24, 25, 30, 47, 64, 65, 76, 120, 124, 140,
153; 29/243, 243.1

[56] References Cited
UNITED STATES PATENTS

| 2,582,731 | 1/1952 | Young.......................... | 227/25 |
| 2,977,599 | 4/1961 | Schlesinger, Jr............... | 227/124 |
| 2,996,720 | 8/1961 | Mackechnie................. | 227/76 |
| 3,310,215 | 3/1967 | Bostick........................ | 227/12 X |

*Primary Examiner*—Granville Y. Custer, Jr.
*Attorney*—Waters, Roditi Schwartz & Nissen ABSTRACT: Device for the stretching and the application of tape material to discrete wires to form a framework structure, particularly for flower cultivation.

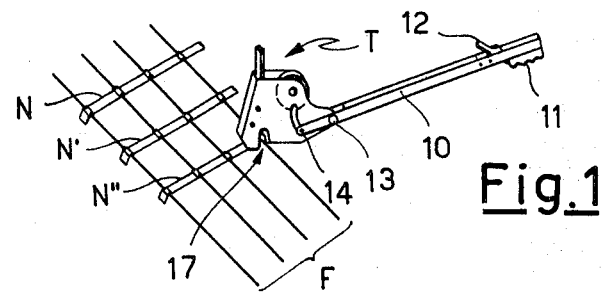
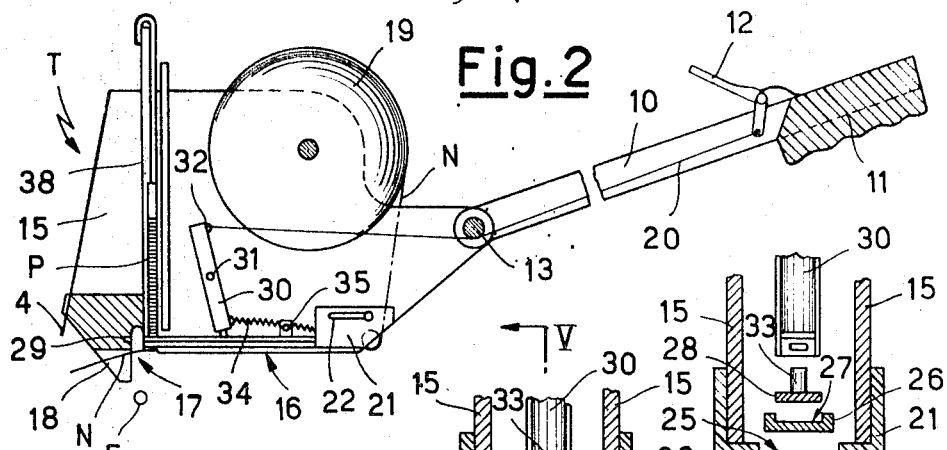
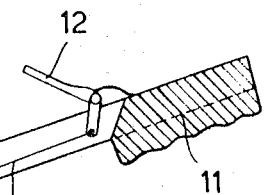
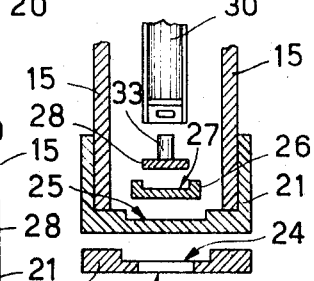
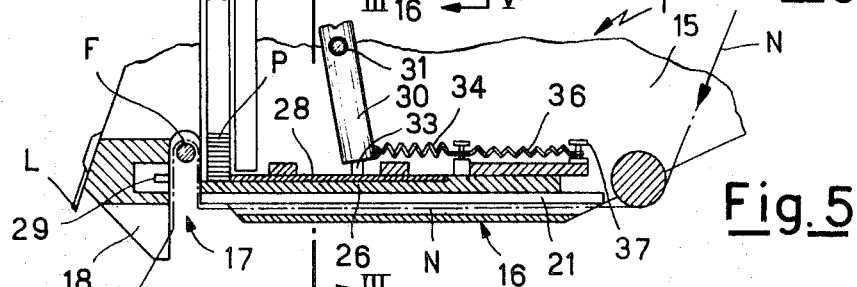
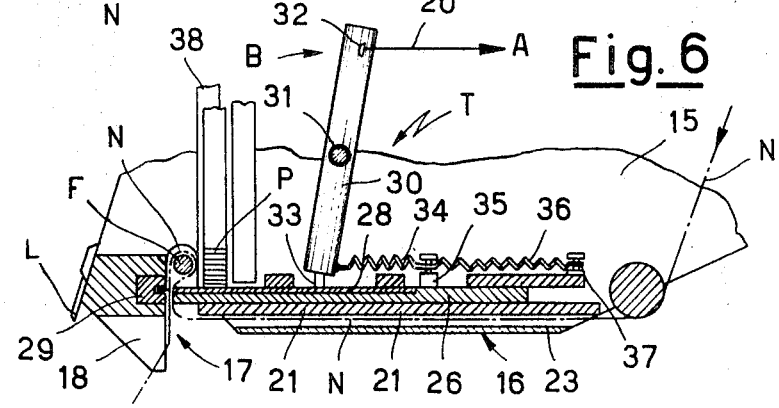

DEVICE FOR THE APPLICATION OF TAPE TO WIRE

This invention relates to a device by means of which the operations of laying and binding material in the form of tape, particularly plastic tape such as polyethylene, polyvinylchloride and similar substances, on to taut metallic wires can be carried out rapidly, efficiently and at a high rate of production. It is also suitable for equivalent applications which are of similar condition to those indicated below.

A particularly advantageous field of application of the device according to the invention is that of flower cultivation and above all in the technique of cultivation of long-stem flowers which have to be suitably supported during their growth. As is well known, in the intensive cultivation of such flowers cultivated in rows, for example, carnations, taut metallic wires are arranged parallel to one another and spaced apart above the rows, through which the plants grow, and which are thus supported or more precisely restrained from falling over in the direction at right angles to the direction of the wires. In order to obtain a corresponding support which restrains the plants from falling over in planes parallel to those of the wires, bands of raffia or other substances are tied across the wires to constitute a framework by which each plant is supported in every direction inside the framework.

The operations for the preparation of this framework are at present carried out by hand, with obvious undesirable consumption of time and skilled labor.

The object of this invention is to provide a device or tool which effectively carries out the operations for the formation of the said framework, by means of stretching plastic or similar tape at right angles to the taut metallic wires and clipping the tape to at least some and preferably all of the metallic or possibly nonmetallic wires which are crossed by the said tape.

In essence the device according to the invention includes a structure carrying a storage section which can contain a suitable quantity of tape in the form of a roll or bobbin, from which the tape can be progressively unwound and pulled out, guiding means for winding the tape across the cavity of a hollow part located at the edge of the structure and shaped such that if the device is pushed on to a taut wire, the wire penetrates totally into the cavity of the said part so compelling the tape to superimpose itself above and around the wire to form a loop, a mechanism for applying and riveting staples which are applied under the wire which is surrounded by the tape in order to connect together the two ends of the loop and so contain the wire, and means for operating the said mechanism when the condition of superimposing and at least partial enveloping of the wire has been reached.

Following the execution of the operation of superimposing and closing the loop of the tape around a wire, and in particular around one of the end wires of the plurality of parallel wires, the tape is thus bound to the said wire. By then moving the device so that it is superimposed on the next wire, the tape unwinds from the storage space and stretches itself between the two wires. Repetition of the clipping operation clips the tape to this next wire and the said operations of successively moving the device on the different wires and clipping the tape to them brings about the formation of a transverse element of the framework as desired to form. When this element has been completed the tape can be cut off by using a cutting means which can suitably form part of the device itself, and the said succession of operations is completed until the framework is complete.

Contrary to the conditions under which traditional mechanisms for the application and riveting of staples (such as the well-known stapling machines used for example for clipping together sheets of paper or similar) operate, the mechanism associated with the device which is the object of the invention, and operating under the described conditions, must complete the closing of the loop formed from the tape enveloping the wire before the closure or riveting of the staple, an operation which necessitates the advancement of the staple through the cavity in which the wire has been previously inserted, and that is an advancement through an open space in which the staple will not be sustained and guided. For these reasons, and according to an important complementary characteristic of the invention, the mechanism associated with the device includes a system of mobile parts one of which comprises a driver for advancing and pressing the successive metallic staples through the said space and against the small anvil thus effecting the closing of the arms of the said staple, and another of which comprises a means for initial seating and thence for support and guidance for the staple as it advances into the said free space. This second part moves in the same direction as the above indicated means for advancing and pressing, effecting the closure of the loop so that the staple is supported and guided until it is in front of the anvil or opposing part, in order to obtain the said riveting effect, while the loop has been previously closed and its opposing part appears in front of the anvil.

This and other more specific characteristics of the device together with its possibilities of employment and the consequent attainment of the objects of the invention, will become evident in the course of the following detailed description of a nonexclusive embodiment of the invention, shown in the accompanying drawing in which:

FIG. 1 shows a perspective schematic view of an embodiment of the device during the execution of the operations described above;

FIG. 2 shows on a larger scale and in greater detail a partial section through the longitudinal place of symmetry of the device according to the invention with certain simplifications and schematic representations;

FIG. 3 is a transverse section through the line III—III of FIG. 5.

FIG. 4 is an exploded view of the apparatus in FIG. 3 with the components arranged in their correct order for their assembly;

FIG. 5 is a sectional view of the operative part of the device through the longitudinal plane indicated by V—V in FIG. 3, and in the initial operating conditions of the application mechanism;

FIG. 6 shows the same apparatus as in FIG. 5 in the position where it is just about to apply and close the staple with consequent binding of the tape around one of the wires.

As indicated schematically in FIG. 1 the device according to the invention in generally but not exclusively intended for stretching and fixing lengths, N, N', N'', ... of tape, for example polyethylene tape, across a plurality of wires F which would in general but not necessarily be metallic and previously assembled taut in the same plane and parallel to each other, so as to form a framework of mesh, the individual spaces of which ensure the support in all directions for plant growth and in particular for long-stem flowers.

The device includes a body or head T, which is described below, connected to a rod 10 which terminates in a handle 11 close to which a control member such as a lever 12 is situated. The length of the said rod and its position with respect to the head T can be selected beforehand according to the working conditions in order to permit the effected and rapid execution of the process. In particular the rod 10 can be assembled so that it rotates around a pin 13, and fixed in different positions with respect to the head T by means of a locking screw 14, so that the device can be adapted for operation on wires F at different heights from the ground, without compelling the operator to bend excessively or assume unreasonable positions.

Under the conditions shown schematically in FIG. 1 the application of the tape is effected by locating the device on the left-hand wire of the plurality of wires, clipping the tape to the said wire, and successively moving the device on the other wires, repeating the clipping operation. The tape is finally withdrawn leaving a suitable excess at the end of the formation of every transversal element of the framework.

As can be better seen in FIG. 2, the operative head T of the device whose structure is formed largely of two parallel spaced sides 15, includes at its lower part a flat surface 16 which slides on the wire, terminating in a cavity 17 of a width and depth sufficient for receiving the wire F (as can be seen in detail in FIG. 5) the insertion of the wire into the said cavity being assured by the presence of a projection or prong 18. The presentation of the device at each wire F gives rise in practice to the resting of the head T on to the wire itself, until the said wire inserts itself into the base of the cavity 17.

A reel or bobbin 19 or tape is arranged between the sides 15 so that it can be changed when empty, and from which the tape N is progressively pulled out and guided until it passes in front of the cavity 17, wherein it is compelled to superimpose itself on the wire thus forming a loop which is closed by a metallic staple, by activating the lever 12 which operates the application mechanism by means for example of a flexible tie rod 20.

The structural details and operating principles of the device can be observed more clearly in FIGS. 3—6. The sides 15 are joined together at their lower edge by a U-piece 21, which can be suitably made movable lengthwise for example by sliding along slits 22 (FIG. 2) in order to expel any staples which are deformed or jammed (in the same way as that used in conventional stapling machines). Underneath the U-piece 21 a plate 23 is fixed, whose lower face forms the said surface 16 and whose upper face includes a longitudinal cavity 24 (FIG. 4) in which the tape N slides and is guided.

The upper face of the lower part of the U-piece 21 includes in turn a cavity 25 (FIG. 4) which houses and guides a piece 26 which slides lengthwise and which also includes a cavity 27 (FIG. 4) for seating and guiding a final piece in the form of a strip 28 constituting the driver for advancing and pressing the successive staples across the width of the cavity 17 and against a small anvil 29, against which the metallic staples are clinched.

The advancement of the driver 28 is effected by means of a lever 30 pivotally supported about a pin 31, whose upper end at 32 has fixed to it the extremity of the tie rod 20 (FIGS. 2 and 6), and whose lower end engages projecting prong 33 integral with the driver 28. By means of a spring 34 the lower end of the lever 30 is linked to a further projecting prong 35 integral with the guide piece 26 and is returned by a second spring 36 anchored at 37 to a point on the fixed structure of the head T.

The metallic staples suitably lined up in a magazine and indicated by P are guided so that they slide along a guide piece 38 and are pushed in known manner by means of a suitable elastic system so that the foremost metallic staple is coplanar with the driver 28 when the latter is pulled back (FIG. 5). The details of the means for guiding and advancing the metallic staples are not described because they correspond to those adopted in the conventional stapling machines for metallic staples, for example those used in offices.

The details and characteristic operating conditions of the device can be seen by comparing FIGS. 5 and 6.

In FIG. 5 the components of the mechanism for applying the metallic staples are represented in their rest position, with the device positioned on a wire F enveloped at the base of the hollow of the cavity 17. The tape N thus forms a loop above and around the wire and parts of the tape are side by side and spaced apart along two sides of the cavity 17. By activating the lever 12 (FIGS. 1 and 2) the force A (FIG. 6) on the tie rod 20 forces the lever 30 to move in the direction B, by pivoting around pin 31. This movement advances the driver 28 by means of the prong 33, and the movement of advancement is accompanied by movement of the underneath guide piece 26, pulled by the spring 34. The foremost metallic staple rests in the cavity 27 (FIG. 4) of this guide piece, engaged by the driver 28, and the guide piece 26 supports and protects the metallic staple during its advancement across the width of the cavity 17.

Following these movements and as represented in FIG. 6 the loop formed from the tape N around the wire F closes itself, and two points of the tape come into contact under the wire F in front of the anvil 29 (in the drawing the two branches of the tape are shown a slight distance apart solely for clarity in representation). The movement of the driver 28 forces the metallic staple through the tape at the said two points and closes it by clinching it against the anvil 29. The guide piece 26 does not participate in the final movement of the driver 28 due to elastic give of the spring 34. During these movements the spring 36 is obviously compelled to extend itself.

Upon releasing of the handle (the lever 12) the spring 36 returns the guide piece 26 to its backward position and the spring 34 pulls back in turn the driver 28 so that the said parts take up the backward rest position as shown in FIG. 5, in which it can be seen that the driver 28, being further back than the underneath guide piece 26, uncovers the forward extremity of the cavity of this latter, into which a new staple P can fall so arranging itself for the next cycle of operation.

This withdrawal leaves the wire F enveloped and closed by the tape N in the cavity 17, and the simple movement of raising the head T of the device allows the wire to be freed and the described operations to be carried out on the other adjacent wires of the plurality of adjacent wires.

The device can be usefully completed by including a cutting member such as a cutting blade L, fixed to the front end of the head T so that it allows the cutting of the tape N at a point sufficiently distant from the point of closure of the loop and of application of the staple so as not to prejudice the reliability of the clipping.

The device according to the invention has been described with reference to its specific field of employment for the formation of sustaining framework for flowers and similar items. Obviously the device can be employed with possible structural and dimensional modifications for other equivalent applications, for example for the fixing of tape to the edge of boxes, around hooks, etc.

It is further evident that the technical constructive details described above as one example, can be substituted by other equivalent details without deviating from the inventive concept.

What I claim is:

1. A device for successively stapling deformable tape transversely to stretched parallel wires, said device comprising a housing having a planar edge adapted for transverse sliding of the device on a wire, said housing having a recess at one end of said planar edge for receiving a wire, means on said housing for supporting a supply of tape and for guiding a length of tape across the recess so that upon entry of the wire into the recess the tape is carried therewith and deformed into two leg portions straddling the wire, said recess having a depth greater than the diameter of said wire, a projection at the side of the recess opposite the planar edge and extending beyond the plane of said edge to limit travel of the planar edge on the wire until the wire contacts the projection and the wire can then enter the recess, a staple-clinching anvil above the plane of said edge on the side of the recess opposite said edge, said recess having a bottom in said housing and said anvil being spaced from said bottom by a distance greater than the diameter of said wire, a staple magazine on said housing containing a plurality of staples individually positionable at the level of the anvil on the side of the recess opposite thereto, and operator-actuated means including a tape-presser member slidably supported in said housing for reciprocation parallel to said planar edge across the recess for closing a loop of tape around the wire by pressing both legs of the tape together around the wire located at the bottom of the recess, and a staple-driving member slidable on said presser member to drive a staple from the magazine and clinch it against said anvil after passage through the pressed legs of the tape looped around the wire, said length of tape being guided in said housing across the recess at a level between the plane of said edge and the path of reciprocable travel of the tape-presser member, said presser member being coupled to said driving member to support the same and the staple driven thereby across said recess.

2. A device as claimed in claim 1 wherein said operator-actuated means further comprises a movable lever means connected to said staple-driving member to reciprocate the same, and spring means connecting said tape-presser member and said staple-driving member for displacing said presser member concurrently with said driving member until said tape legs are pressed together to form said loop.

3. A device as claimed in claim 2 wherein said operator-actuated means further comprises second spring means connecting said tape presser member and said staple-driving member for currently returning said members to a rest position upon termination of the action on said lever means.

4. A device as claimed in claim 1 including cutting means for cutting said tape after said tape has been stapled to said wire.